Aug. 5, 1941.  W. F. SMITH  2,251,469
BEARING
Filed Sept. 23, 1938
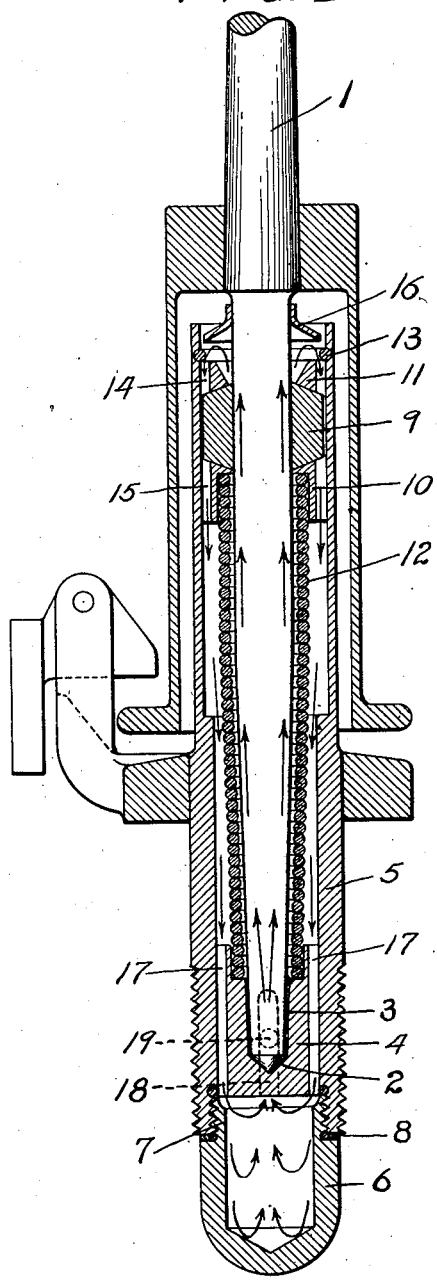
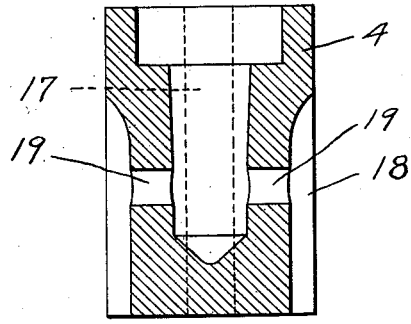
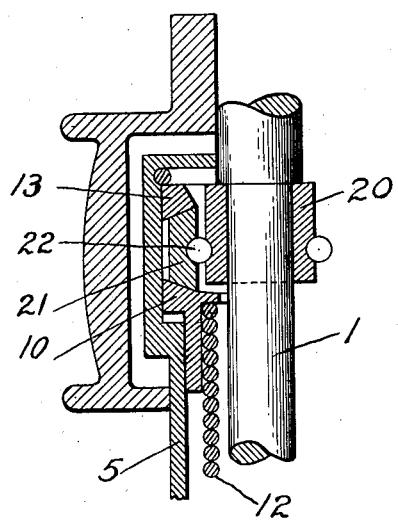
WILLIAM F. SMITH
INVENTOR
BY *Pauekolisch*
ATTORNEY Patented Aug. 5, 1941

2,251,469

UNITED STATES PATENT OFFICE 2,251,469

BEARING

William F. Smith, Brooklyn, N. Y.

Application September 23, 1938, Serial No. 231,289

3 Claims. (Cl. 308—169)

This invention relates to new and useful improvements in bearings, and more particularly to bearings on structures like high speed textile spindles where the usual ball and roller bearing cannot be used to good advantage.

The object of the invention is to provide a bearing structure which in spite of the well known operating difficulties encountered will be continuously lubricated during operation.

Preferably, though not necessarily, the bearing is composed of self-lubricating materials, i. e., of porous bronze or the like, in the interstices of which graphite and oil are trapped. When such bearing heats up, the expansion of the oil causes it to come to the surface, and when the bearing cools off the excess oil is reabsorbed. Depending on their thickness, such bearings can hold as much as two-thirds of their volume in lubricant, and the entrapped lubricant can be supplemented by a separate reservoir of oil.

The use of self-lubricating bearings is particularly to be recommended in combination with spindles having chromium plated bearing surfaces.

In order to explain the nature of the invention, I shall disclose certain embodiments thereof and shall define its scope in the appended claims.

One embodiment of the invention is illustrated in Fig. 1 which is a vertical cross-section of a bearing structure for a shaft, spindle or blade such as is used in textile machinery;

Fig. 2 is an enlarged vertical cross-section of the step bearing shown in Fig. 1; and Fig. 3 is a vertical cross-section of a ball bearing which may be used in the place of the neck bearing shown in Fig. 1.

1 is a vertical blade, the lower portion of which is pivoted in a step bearing of special construction. Preferably, though not necessarily, this lower portion of the blade is chromium plated. The pointed tip or pivot 2 of the shaft and its tapering lower end 3 are seated in the step bearing 4 held in a steel casing 5 and positioned therein by means of an oil sump 6. Good results may be obtained if the bearing 4 is of self-lubricating material, but the use of such material is not necessary. The oil sump 6 has an externally screw-threaded neck 7 which screws into the internally screw threaded open end of casing 5, an oil tight seal being insured by a paper washer 8. The step bearing 4 is seated on the annular ledge formed by 7.

The upper part of the tapered blade end is held by a neck bearing comprising a bushing 9, also preferably of self-lubricating material. The two ends of the bushing 9 are tapered and fit within a correspondingly tapering seat formed by a cylinder 10 constituting a lower ball socket, and a ring 11 constituting the upper ball socket and which may also be of self-lubricating material. The taper of the neck bearing and its seat is formed to a radius which is not struck from the geometrical center of the bushing 9 but from a point well below that.

The cylinder 10 is a sliding fit within the upper portion of casing 5 and is seated on a coiled spring 12 which is tapered to conform to the taper of the blade. The upper ball socket 11 is held in the casing 5 by means of a spring ring 13 which engages with a groove in the casing. The bushing 9 clears the walls of the casing 5 all around. The cylinder 10 and ring 11 contact with the inside surface of 5, except for one or more grooves such as 14, 15 cut in their sides.

The tapered spiral spring 12 is tightly wound and its lower end is closely fitted in a counterbore in the upper end of step bearing 4. The upper two or three turns of spring 12 which are within the cylindrical member 10 are not tightly wound and tend to lift member 10, the upper rim of which serves as a seat for the neck bearing 9. The spring in effect forms a tube conforming to the contour of spindle 1 with an internal thread clearing the spindle, whereby oil will be fed from sump 6 spirally upwards under the influence of the centrifugal force set up in the oil by the rotating blade. This action is further supplemented by the taper of the spring conforming to that of the shaft and the combined action causes positive and continuous circulation of oil through the neck bearing 9 in the direction indicated by the arrows.

When the blade 1 rotates and bearings 4 and 9 heat up, if these bearings are made of self-lubricating material, a layer of lubricant will form thereon which will protect the cooperating bearing surfaces of the shaft from becoming damaged without regard to fresh oil supply from sump 6. When these bearings cool off, they will reabsorb oil and will thus be available as local oil reservoirs.

The oil will continue its upward travel along the blade 1 until it is deflected by a collar 16 provided on the blade. From the deflector collar the oil will drip and flow down through grooves 14, then between bushing 9 and casing 5, grooves 15, then on the outside of the coiled spring 10, and through two diametrically opposed channels 17 in bearing 4, back into the oil sump 6.

In addition to the longitudinal grooves 17 extending throughout its length, the bearing 4 is provided with two shorter longitudinal grooves 18 which are displaced 90° from the grooves 17. Grooves 18 extend only a part of the length from the bottom of bearing 4 and connect with two radial bores 19 which empty into the cavity of the bearing. The oil from sump 6 enters into the bearing through grooves 18 and bores 19.

Metallic or other abrasive particles displaced in the bearing surfaces are carried in the oil by gravity to the sump 6 where, due to the relatively low velocity of the oil and difference of specific gravity, together with change in direction of the oil flow, they are deposited at the bottom and only clean oil, free from abrasive matter, reenters the bearings.

The whole casing 5 forms a reservoir which is normally filled with oil to a point level with socket 11. However, the circulation of oil continues so long as at rest the oil level reaches any point above the top of bearing 4.

Heretofore it has been the practice to permit the oil to enter a tube surrounding the blade through a perforation corresponding to 19 at some point above the step bearing 4. Where the diameter of the shaft is relatively great I have found that the oil is prevented from entering such aperture on account of the centrifugal force created at high speeds. In my construction the taper of bearing 4 above the pivot is made slightly greater than the taper of the blade, so that a gradually increasing clearance is obtained between the blade and the bearing with a minimum clearance at the bottom. This creates an increasing centrifugal force with increase of shaft diameter and causes the oil to be forced upwards. The displacement of oil permits entry of fresh oil through two radial holes 19 in the bottom of the bearing 4.

An important feature of my construction is the means provided to dampen vibration and equalize wear in the bearing surface of the neck bearing 9. In vertical shafts with over-hung unbalanced loads, and particularly in textile spindles of the type shown, it is well known that lateral vibration constitutes the most destructive force to which the bearings and shafts are subjected. This vibration may result from the dynamic unbalance of the rotating shaft or load supported thereon, or from impact of the pulley with irregularities in the frictional belt driving surfaces, or both. To permit the dynamic axis of the rotating element to assume a position coincident with the geometric axis and thereby reduce the magnitude of vibration, the bearing 9 is mounted so as to permit limited and restrained lateral displacement in any plane.

The conforming radii between bearing 9 and sockets 10 and 11 normally center the bearing but permit lateral displacement under the influence of vibration or impact loads, thereby cushioning the stress and shock between shaft and bearing and damping vibration, since the compression on bearing 9 increases as the vertical axis of the shaft is displaced due to the wedge action of the radii or taper between the bearing and its seat.

This method of mounting also permits axial alignment of bearing 9 within predetermined limits sufficient to offset inaccuracies of manufacture or assembly, and which permits a smaller clearance between shaft and bearing with uniform distribution of load on the bearing surfaces.

The bearing 9 is free to rotate around its own axis. It is normally held against rotation by the friction resulting from the compression between members 9, 10 and 11, but under the influence of torque and vibration from the rotating shaft, bearing 9 rotates or creeps slowly and continuously around its own axis. This assures uniform wear around the entire surface of the bearing and avoids localized pressure and wear which would normally result in a fixed bearing and which would impair its useful life.

In place of neck bearing 9 a ball or roller bearing of suitable construction may be used, particularly in large sized spindles where sufficient space is available. The bearing is illustrated in Fig. 3 in which 20 and 21 are the inner and outer raceways, 22 the balls. In all other respects the construction is the same as in Fig. 1.

What is claimed is:

1. In combination, a spindle having a tapered end, a step bearing in which the point of the spindle is pivoted, a neck bearing for the upper part of the tapered end and having tapered upper and lower seats, a spring surrounding the spindle and spaced therefrom and compressed between said bearings, a casing surrounding said bearings and spring, and an oil sump communicating with the pivot point of the spindle through a radial channel in the step bearing and with said casing through an axial channel in said step bearing.

2. In a bearing for the tapered end of a spindle, a step bearing having a tapered cavity for the point of the spindle, a closely wound spiral spring surrounding said spindle throughout most of its tapered end and spaced therefrom, the lower end of the spring resting on top of said step bearing, a neck bearing having tapered upper and lower seats resiliently seated by means of said spring on said step bearing, a casing surrounding said tapered end up to past said neck bearing, and an oil sump enclosing the bottom of said casing and communicating with the cavity in said step bearing.

3. In a bearing for the tapered end of a spindle, a step bearing of self-lubricating material having a tapered cavity for the pivot point of the spindle, the taper of the cavity being slightly greater than the taper of the spindle, a closely wound spiral spring conforming to the contour of the spindle throughout most of the tapered end, the lower end of the spring resting on top of said step bearing, a cylinder seated on the relatively loosely wound upper end of the spring, said cylinder having an upper surface forming a seat sloping towards the spindle, a neck bearing of self-lubricating material surrounding said tapered end above said spring and having edges tapering away from the spindle, the lower edge being partly resting on the sloping seat formed by the upper edge of said cylinder, a sloping socket engaging the upper tapered edge of said bearing, a casing surrounding said tapered end up to past said socket with a clearance between the casing and said spring, the clearance between the casing and the two bearings and seats consisting of longitudinal grooves, short longitudinal grooves displaced with respect to the first mentioned grooves and extending from the bottom of the step bearing to a point below the top thereof, said step bearing having radial perforations through which the short grooves therein communicate with the tapered cavity, and an oil sump enclosing the bottom of said casing and into which the short grooves open.

WILLIAM F. SMITH.